March 29, 1966 G. H. REED ETAL 3,243,134

ENDLESS TAPE CARTRIDGE

Filed May 20, 1963

INVENTORS
Gordon Howard Reed
John George Vickers
By Richard ... Agt

United States Patent Office 3,243,134
Patented Mar. 29, 1966

3,243,134
ENDLESS TAPE CARTRIDGE

Gordon H. Reed and John G. Vickers, St. Helier, Jersey, Channel Islands, assignors to Television Research Limited Filed May 20, 1963, Ser. No. 281,725
Claims priority, application Great Britain, May 25, 1962, 20,277/62
6 Claims. (Cl. 242—55.19)

Figure 1:
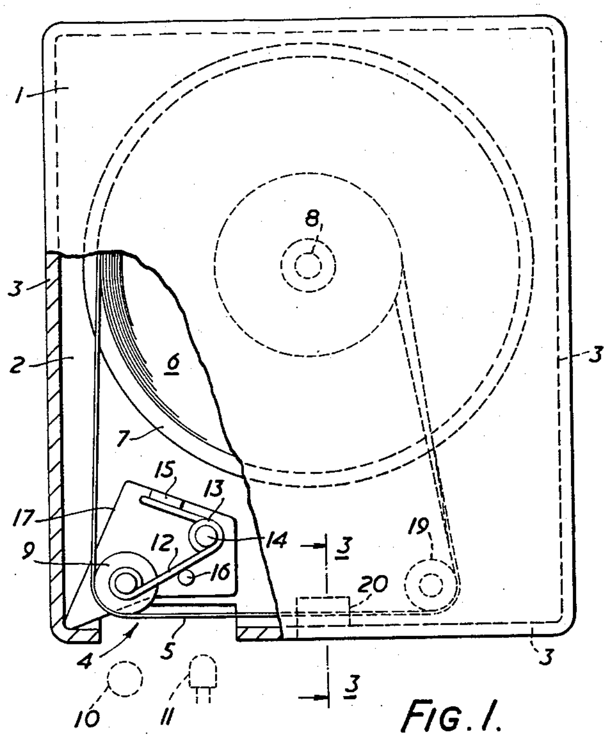

This invention is concerned with tape record units for use with magnetic recording and/or reproducing apparatus and, in particular, with such units of the kind in which an endless length of oxide-coated tape, in the form of a roll, is accommodated in a cassette or other box-like housing and provides a loop of the tape for co-operation with a playback or other magnetic head.

With magnetic tape units of this kind the tape is drawn from the inside of the roll and, after passing the playback or other head, returns to the outside of the roll. In general such movement of the tape is brought about by gripping the tape between a pair of tape-driving elements one of which, in the form of a capstan, is driven, for example, by an electric motor, and the other of which is a free-running pinch roller. Each of several different known forms of such tape-driving arrangements possess some mechanical or economical disadvantage and it is the object of the present invention to provide such tape record units which it is believed will meet more satisfactorily than those hitherto proposed the requirements pertaining to the use of such units by non-technical or non-mechanically minded persons who are not normally accustomed to handling or operating such recording or reproducing apparatus. In particular, it is an object of this invention to provide such tape record units which, whilst permitting desirable relatively resilient mounting of the tape-driving elements, allows the cassette or other housing to be positioned firmly and accurately in association with the apparatus thereby eliminating a possible source of "wow" and other troubles.

According to one aspect of the invention a magnetic tape record unit of the kind herein set forth comprises within the housing of the unit, a tape-engaging roller which is mounted in a manner permitting its axis to be moved transversely and to be tilted, and resilient means which opposes said transverse movement so that, when the unit is arranged in operative association with a recording and/or reproducing apparatus with which it is intended to be used, said roller is urged to hold the tape against a tape-driving element of this apparatus.

According to another aspect of the invention a magnetic tape record unit of the kind herein set forth comprises within the housing of the unit, a tape-engaging roller which is carried between a pair of arms which are independently movable in a manner permitting transverse movement of the axis of the roller within the housing against the action of resilient means whereby, when the unit is arranged in operative association with a recording and/or reproducing apparatus with which it is intended to be used, said roller is urged to hold the tape against a tape-driving element of this apparatus.

Tilting of the axis of the tape-engaging roller, as provided for by such independent movement of each of the pair of arms, the roller more readily can acquire the precise positioning necessary to hold the tape against the driven tape-driving element with evenly distributed pressure.

In one preferred embodiment of the invention said tape engaging roller is carried between a pair of arms one at least of which is formed as an extension of an end of a spiral spring which constitutes a resilient means whereby the axis of the roller is urged transversely in the required direction. Alternatively one at least of said arms is itself of a resilient nature and constitutes the said resilient means. In a further alternative arrangement one at least of the said arms is substantially rigid and spring or other resilient means is arranged to co-operate with the pair for the purpose of urging the axis of the roller transversely in the required direction.

According to a further aspect of the invention a magnetic tape record unit of the kind herein set forth wherein the housing of the unit includes a wall which is provided with a hole and there is accommodated in this hole, as an attachable part to the housing, a plate upon which there is carried a tape-engaging roller the axis of which is movable transversely within the housing against the action of resilient means whereby, when the unit is arranged in operative association with a recording and/or reproducing apparatus with which it is intended to be used, said roller is urged to hold the tape against a tape-driving element of said apparatus.

In one embodiment of the invention a common support, in the form of a plate, is shaped for engagement with a correspondingly shaped aperture or recess in a wall of the housing of the unit, undesired displacement of this plate being prevented by providing upstanding projections or extensions therefrom which are adapted to contact the inside of the opposite wall of the housing. Such an upstanding projection or extension can be used as an anchorage for a spring means whereby the axis of the tape engaging roller is urged transversely in the required direction.

One or more spring influenced catch devices can be used to retain the record unit in operative association with the recording and/or reproducing apparatus and the unit can be formed or provided with means destined to co-operate with such a catch device. For example, that wall of the housing of the unit which is adapted to rest upon the apparatus can be formed with a cavity or other shaping which provides an edge with which such a catch device can engage and retain the unit in an accurately predetermined position on the apparatus until such time as said catch device is released from the said edge.

Figure 2:
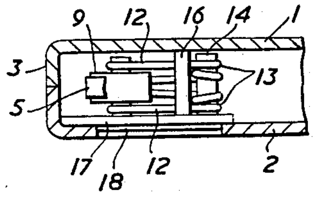
Figure 3:
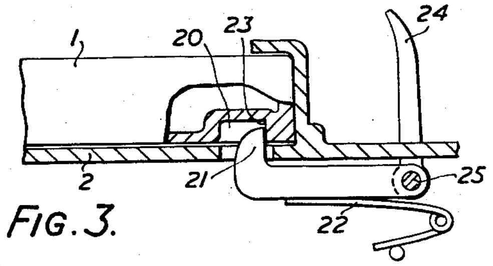

In order that the invention more readily can be understood it will now be described, merely by way of example, with reference to the accompanying drawings wherein:

FIG. 1 is a plan view partly in section, of a magnetic tape record unit, according to one preferred embodiment of the invention, FIG. 2 is a cross sectional view of a portion of FIG. 1 showing the pinch-wheel assembly, and FIG. 3 is a cross sectional view taken on the line 3—3 of FIG. 1 and showing how the record unit is associated with a playback apparatus with which it is intended to be used.

This particular record unit comprises a box-like housing which is formed in two parts, namely a part which provides an upper wall 1 and a part which provides a lower wall 2, each of these parts having side walls 3. These side walls are provided with an opening 4 to expose a loop of magnetic tape 5. This loop is part of an endless length of the tape the bulk of which is arranged, in known manner, as a roll 6 upon a rotatable platform 7. The latter is mounted for rotation about a spiggot 8 which projects upwardly from the lower wall 2 of the housing.

In accordance with the present invention this record unit is provided with a tape-engaging roller 9 which is arranged and adapted for co-operation with a tape-driving element of the playback apparatus. In general such element is a capstan, indicated in dotted lines at 10, driven by an electric motor. Alongside this capstan there is provided, as part of the said apparatus, a playback head, also shown in dotted lines at 11, suitable for co-operation with the tape 5.

The roller 9 is carried between two arms 12 which are formed by extensions of the ends of coiled springs 13, these springs being anchored about an upstanding pin 14 and having their opposite ends in contact with an abutment 15. The anchoring pin 14, abutment 15 and a stop pin 16 extend upwardly from a plate 17 which includes a shaped portion 18 which is adapted to fit snugly into a correspondingly shaped hole in the lower wall 2 of the housing. By arranging that the upper ends of the pin 14, abutment 15 and pin 16 come close to or actually contact the inside of the upper wall 1 of the housing, undesired displacement of the plate 17 and the assembly carried thereby is prevented. However this arrangement permits of easy replacement of the plate and its assembly if at any time this course is desirable. The use of this assembly also enables this particular arrangement of pinch roller to be removed from the unit to facilitate the use of the unit in conjunction with a recording and/or reproducing apparatus in which the pinch roller is a part of this apparatus and comes into operative position through the hole in the lower wall 2 of the housing of the record unit into which the shaped portion 18 of the plate 17 is adapted to be accommodated.

When the unit is not being used with the playback apparatus the arms 12 rest against the stop pin 16 and limit the outward transverse movement of the axis of the roller 9, the several parts in fact occupying the relative positions shown in FIG. 1 of the drawings. When the unit is being attached to the playback apparatus the capstan 10 engages with the tape which is located about the roller 9 and further movement of the unit, to put it into proper operative position on the apparatus, causes the roller 9 and consequently its axis to be moved transversely about the pin 14 to further stress the springs 13 so that the latter function to urge the roller 9 in a direction which causes it to hold the tape in pressure contact with the capstan. The latter, when being driven, will draw the tape from the center of the roll 6, about a guide 19 and past the playback head 11, the tape returning to the roll at the periphery thereof. The fact that each of the arms 12 is independently movable ensures that the roller 9 will grip the tape against the capstan 10 with a substantially evenly distributed pressure. Preferably the roller 9 includes a peripheral surface formed by rubber or other suitable resilient material.

A simple arrangement whereby the record unit can be attached to the playback apparatus in a removable manner is shown in FIG. 3 and comprises the provision of a cavity 20 (also shown in dotted lines in FIG. 1) in the lower wall 2 of the housing of the unit to receive a catch device 21 which is influenced by a spring 22 in a manner which ensures that disengagement of this catch from the edge 23 of the cavity 20 is dependent upon appropriate actuation of a lever 24 which is fixed to a shaft 25 to which the catch 21 is also fixed.

What we claim is:

1. A tape record unit comprising, in combination:

(a) a housing formed with a cavity therein and having two opposite walls in said cavity, one of said walls being formed with a hole therein;

(b) means for rotatably supporting a roll of tape in said cavity; and (c) guide means for guiding tape from said roll in a loop, the guide means including (1) a plate member including a portion removably disposed in said hole;

(2) a roller member mounted on said plate member for rotation about an axis, (3) yieldably resilient means urging said roller member to move on said plate member in a direction transverse to said axis, said housing being formed with an opening for access to a tape portion guided over said roller member, and (4) projection means on said plate member extending therefrom toward the other one of said walls for contact with the same to prevent movement of said plate member outward of said hole.

2. A unit as set forth in claim 1, wherein said housing has a side wall connecting said opposite walls, said opening being formed in said side wall.

3. A unit as set forth in claim 1, wherein said yieldably resilient means comprises two arms pivoted on said plate member and respectively engaging axially spaced portions of said roller member for rotatably securing the same to said plate member.

4. A unit as set forth in claim 3, wherein said yieldably resilient means comprises two spring members.

5. A unit as set forth in claim 3, wherein said arms are pivoted on said projection means.

6. A unit as set forth in claim 1, wherein said yieldably resilient means include two spring members mounted on said projection means, each spring member having an arm portion arcuately movable relative to said projection means and rotatably supporting respective axial portions of said roller member.

References Cited by the Examiner

UNITED STATES PATENTS

| | | | |
|---|---|---|---|
| 2,418,545 | 4/1947 | Zimmerman | 226—187 X |
| 2,804,508 | 8/1957 | Mastling et al. | 242—55.13 |
| 2,988,954 | 6/1961 | Kuhnert et al. | 242—55.13 |
| 3,017,803 | 1/1962 | Sakaki | 242—55.13 |
| 3,021,989 | 2/1962 | Sellers | 226—187 X |
| 3,029,992 | 4/1962 | Roman | 226—187 X |

FOREIGN PATENTS

| | | |
|---|---|---|
| 1,094,401 | 12/1954 | France. |
| 810,674 | 3/1959 | Great Britain. |

MERVIN STEIN, *Primary Examiner.*

B. TAYLOR, *Assistant Examiner.*